(12) United States Patent
Jalowiecki et al.

(10) Patent No.: US 7,865,662 B2
(45) Date of Patent: Jan. 4, 2011

(54) SCALABLE PROCESSING NETWORK FOR SEARCHING AND ADDING IN A CONTENT ADDRESSABLE MEMORY

(75) Inventors: Ian Jalowiecki, High Wycombe (GB); Martin Whitaker, High Wycombe (GB); John Lancaster, High Wycombe (GB); Donald Boughton, High Wycombe (GB)

(73) Assignee: Aspex Technology Limited, Buckinghamshire (GB)

( * ) Notice: Subject to any disclaimer, the term of this patent is extended or adjusted under 35 U.S.C. 154(b) by 1389 days.

(21) Appl. No.: 10/539,493

(22) PCT Filed: Dec. 17, 2003

(86) PCT No.: PCT/GB03/05532

§ 371 (c)(1),
(2), (4) Date: Jan. 17, 2006

(87) PCT Pub. No.: WO2004/055688

PCT Pub. Date: Jul. 1, 2004

(65) Prior Publication Data

US 2006/0184689 A1    Aug. 17, 2006

(30) Foreign Application Priority Data

Dec. 17, 2002    (GB) ................... 0229368.6

(51) Int. Cl.
G06F 12/00 (2006.01)
G06F 13/00 (2006.01)
G06F 13/28 (2006.01)

(52) U.S. Cl. ............... 711/108; 711/E12.001

(58) Field of Classification Search ........... 711/108, 711/E12.001
See application file for complete search history.

(56) References Cited

U.S. PATENT DOCUMENTS 5,974,521 A * 10/1999 Akerib ................ 712/11

OTHER PUBLICATIONS

Marriott et al. "Towards the automated design of application specific array processors (ASAPs)" Application Specific Array Processors, 1990, Proceedings of the International Conference on Princeton, NJ, USA, Sep. 1990 p. 415, line 1-line 16.*
Grosspietsch et al., "The Associative Processor System CAPRA: Architecture and Applications" IEEE Micro, IEEE Inc., vol. 12, No. 6, Dec. 1992 p. 64, left column line 2-right column, line 7 Figure 5.*

* cited by examiner

Primary Examiner—Matt Kim
Assistant Examiner—Ralph A Verderamo, III
(74) Attorney, Agent, or Firm—Dinsmore & Shohl LLP (57) ABSTRACT

An alternation network for use with a content addressable memory for implementing a divide and conquer algorithm is described. The alternation network comprises: a plurality of alternation modules connected in series together, each module comprising: a plurality of cascaded logic gates arranged to propagate a match parity signal via the gates along at least part of a matching result vector, the matching result vector being generated by execution of a matching instruction on the content addressable memory, and the logic gates being configured to change the parity of the match parity signal in accordance with the matching result vector; and a vector output arranged to output a parity level vector of the propagated match parity signal present at the each gate of the plurality of logic gates; a logic network for dividing the matching result vector into an odd match vector and an even match vector representing respectively odd and even numbered elements of the matching result vector, by use of the parity level vector, and means for writing a selected one of the odd and even match vectors to the content addressable memory.

37 Claims, 8 Drawing Sheets

SCALABLE PROCESSING NETWORK FOR SEARCHING AND ADDING IN A CONTENT ADDRESSABLE MEMORY

BACKGROUND OF THE INVENTION

This Invention relates to scalable processing networks, in particular but not restricted to processing networks employing concurrent microprocessor technology used in the communications industry.

A common type of processor function is to locate in a memory store all occurrences of a desired value, and then to determine the sum of all occurrences. Typically this is achieved through a series of synchronous matching actions wherein each memory store location is searched and matched in turn. However, this implementation is wasteful of time and processor cycles.

In a case where a processor has an associated local memory store, for example the multiprocessor implementation of Single Instruction Multiple Data (SIMD) processors which is the subject of the applicant's European Patent published as EP 0983556, the search and summation function as described in the above paragraph may be carried out through a type of inter-processor communication known as 'alternation'.

Efficient inter-processor communications in SIMD data parallel processors is paramount to performance. Algorithms that require efficient inter-processor communications are the so-called, binary 'divide-and-conquer' algorithms, whereby the multitude of processors in a data parallel architecture are sub-divided into even/odd subsets in an efficient manner, enable the efficient processing of large amounts of data.

BRIEF SUMMARY OF THE INVENTION

Figure 1:
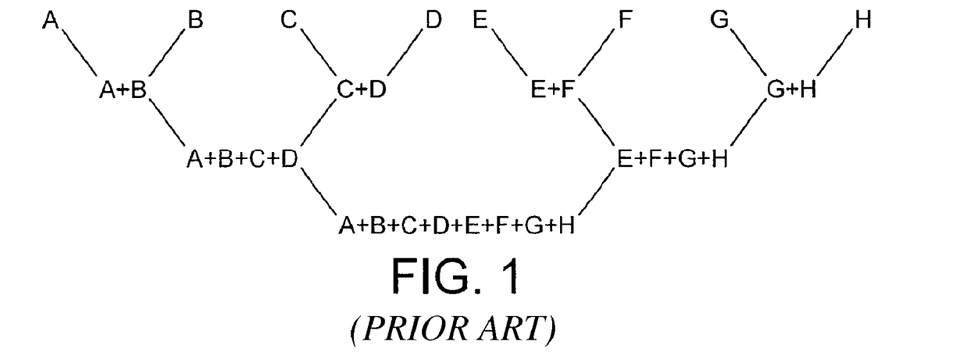
FIG. 1 is a schematic example showing the 'divide and conquer' principle.

FIG. 1 illustrates this principal, showing the summation of eight numbers (A to H) by successively adding even-odd pairs in $\log_2 N$ steps, where N=8. Thus the summation of A to H is achieved in three steps, compared to at least eight steps using the previous method of synchronous summation of each data value (A to H) in turn.

There have been some attempts in the past to implement these divide and conquer algorithms in hardware as alternation networks. These attempts have resulted in a basic building block being known which can be replicated to provide a scalable solution.

The basic logic building block of the known alternation network comprises a linear string of EXOR (Exclusive-OR) gates, one string per SIMD processor, connected so that the control signal is local to the processor, and the communication signal propagates to the next processor.

Figure 2:
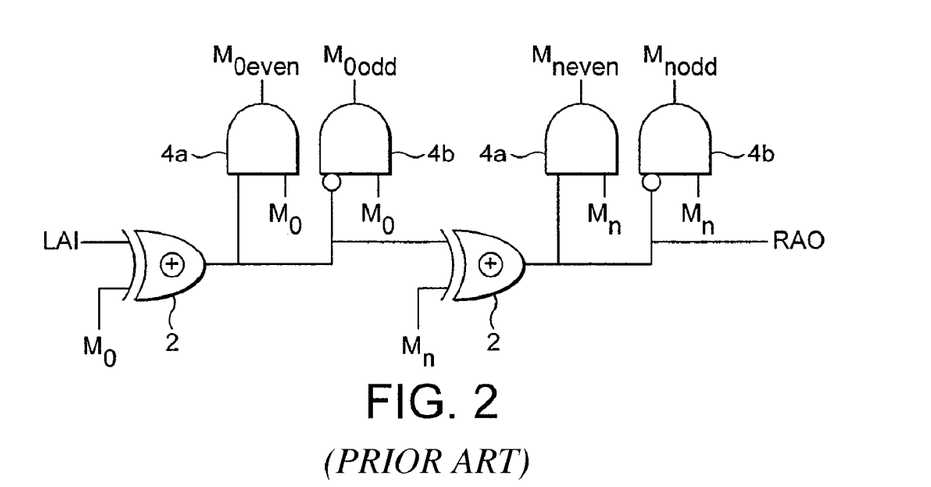
FIG. 2 is a circuit diagram showing a hardware implementation of the basic functional logic block of the alternation network.

FIG. 2 shows such a solution. The alternation network consists of EXOR gates 2 and a pair of AND gates 4a and 4b connected in the arrangement as shown. Upon instruction from a CPU (not shown in FIG. 2) each SIMD processor generates a status signal called a 'match' signal, where the match signal from the nth processor is termed $M_n$. The application of the match signals causes the generation of a signal which propagates between processors, swapping state whenever it encounters a condition where a local match ($M_n$) is true. By combining a propagation term RAO in true or complement form with the original match signal, then two new match states can be generated from AND gates 4a and 4b, termed $M_{n_{even}}$ and $M_{n_{odd}}$. As can be seen from FIG. 2, an inverter is provided at one input of each AND gate 4b such that only one output from the pair of AND gates 4a or 4b will be true at any given time with the same inputs going into both gates 4a and 4b. The propagation term RAO is then fed, for example, into the input of the next alternation network. The input LAI can be user defined or it can be an assumed value.

The versatility of this solution is that it allows the even and odd match sets to be easily generated, offering application flexibility. However, there is a significant drawback namely its very poor speed of execution, which is due to the propagating signal being limited by the gate delay of a single EXOR gate and the number of processors in the string.

Providing a prior art example, an alternation network comprising the VASP-256 data parallel processor comprises a network of 256 EXOR gates, one per processor. Execution of an alternate instruction using the prior art alternation network requires approximately eleven clock cycles (at 50 MHz) to completely generate an even-odd partition of $M_0$ to $M_{255}$. This as will be described later on is very slow in relative terms.

It is thus a first object of the invention to provide improved hardware support in microprocessor architecture for a binary alternation operation. Further objects of the invention include provision of transparent operation across chip boundaries in modular multi-chip solutions with a minimum of external hardware support, and for a microprocessor possessing suitable architecture to complete the alternation process in a minimum number of clock cycles, preferably one cycle, irrespective of the number of microprocessors used.

Another object of the present invention is to implement a relatively fast asynchronous addition of remotely located elements in a content addressable memory.

It is therefore provided as a solution to the above problems the following an alternation network for use with a content addressable memory for implementing a divide and conquer algorithm, the network comprising: a plurality of alternation modules connected in series together, each module comprising: a plurality of cascaded logic gates arranged to propagate a match parity signal via the gates along at least part of a matching result vector, the matching result vector being generated by execution of a matching instruction on the content addressable memory, and the logic gates being configured to change the parity of the match parity signal in accordance with the matching result vector; and a vector output arranged to output a parity level vector of the propagated match parity signal present at the each gate of the plurality of logic gates; a logic network for dividing the matching result vector into an odd match vector and an even match vector representing respectively odd and even numbered elements of the matching result vector, by use of the parity level vector; and means for writing a selected one of the odd and even match vectors to the content addressable memory.

The advantage of this structure is that it enables implementation of a divide and conquer algorithm to be realised in hardware such that massive improvements in speed can be achieved. The speedup is due to the ability to split the matching vector generated by the content addressable memory into odd and even vectors in a few clock cycles and thereafter to iteratively apply the search, and split process to arrive at a single processed element.

Further optional features to the invention in the above embodiments are described in the appended claims.

According to another aspect of the present invention there is provided a communications network for use with a content addressable memory for moving data between remote locations, the network comprising: dividing means for dividing a matching result vector generated by execution of a matching instruction on the content addressable memory, into an odd match vector and an even match vector representing respectively odd and even numbered elements of the matching result vector; assigning means for assigning the odd and even match vectors as source and destination locations; a plurality of cascaded logic gates arranged to propagate data via the gates along at least part of the matching result vector; input means for inputting a bit of a stored data value associated with a source location into the plurality of cascaded logic gates; applying means for applying the source and destination results to the plurality of cascaded logic gates to propagate the bit of stored data at the source location to the destination location; and extracting means for extracting the input bit from the plurality of cascaded logic gates at the destination location.

This communications network supports a search and add process which can be used effectively in a content addressable memory to carry out asynchronous remote addition. It does not matter what the distance is between the different elements that need to be added together, the time taken to implement the addition is the same (in clock cycles). Communication can be effected concurrently which leads to further speed ups and allows the divide and conquer algorithm to be applied effectively and efficiently.

There is a particular benefit when both the alternation network and the communications network are combined together, the resultant speed up of operation provides a significant advance over the prior art.

According to a further aspect of the present invention there is provided a combination of an alternation network as described above and a content addressable memory, the content addressable memory being arranged to receive the selected one of the odd and even match vectors for use as a matching result vector in a further iteration of the divide and conquer algorithm.

This combination advantageously leads to a compact and relatively fast improved hardware implementation of the desired divide and conquer algorithm.

Furthermore the present invention also extends to a combination of a communication network as described above, a content addressable memory, and a plurality of addition registers.

BRIEF DESCRIPTION OF THE DRAWINGS

In order that the invention may be more readily understood, some embodiments in accordance therewith will now be described, by way of example, with reference to the accompanying drawings, in which.

DETAILED DESCRIPTION OF THE INVENTION

By way of background, a typical SIMD processor with which the invention can be reduced to practice is the Associative String Processor (ASP) data parallel processor manufactured by Aspex Technology Limited. The ASP is a SIMD data processor that in typical configurations operates on 1024 to 65536 data items in parallel. One of the features of the ASP processor is the string (one-dimensional) topology of the processor array, wherein the processing elements are connected end-to-end. This facilitates some of the features of the network described in the following, although the principles of the invention may obviously be applied to other processors, SIMD or not. It is noted that the ASP is associated to a portion of memory that is referred to as 'local memory', and the ASP may be programmed by a Central Processing Unit (CPU) which is able to off-load tasks to the ASP, for example processing data stored in the local memory associated to that ASP. This locally accessible memory is referred to as Content Addressable Memory (CAM).

Figure 3:
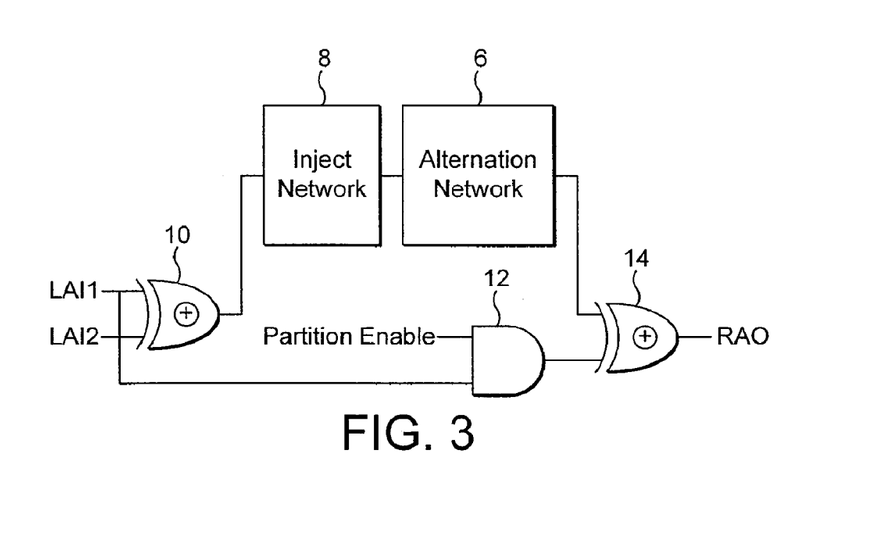
FIG. 3 is a circuit diagram showing a novel implementation of the alternation network of FIG. 2.

An improved version of the alternation network architecture according to an embodiment of the present invention is illustrated in FIG. 3 which shows a modular alternation network.

The module 6 labeled 'alternation network' corresponds to the basic alternation network shown in FIG. 2. Typically this portion of the network comprises only a few stages (processing elements), since propagation through this network must be carried out twice, the first time to allow propagation to occur throughout the alternation network, reaching a static output and determining a correction term. The second time is when applying the correction term to produce the final even-odd sets. Consequently this sub-network must be kept as short as possible, consistent with the requirements of the floorplan.

It is helpful here to note that the alternation network 6 as shown may comprise a number of structures as shown in FIG. 2. Typically 16 ASP processors arranged in this way in a network are known as a 'segment'. Following the segment, four segments arranged together are known as a 'group', four groups arranged together known as 'block', four blocks arranged together known as a 'quad' and four quads arranged together to form a 'chip'. This hierarchical arrangement can be thought of as a microprocessor chip having various subnets of smaller groups of standardised sub-components.

In FIG. 3 there are sixteen ASP processors connected in the alternation network 6, and this building block shall be referred to as a 'segment' hereafter.

The module 8 labeled 'inject network' determines what the initial input to the alternation network based upon a number of factors, or it may be an assumed value. One of the values that may comprise the input to the alternation network is obtained from the output of an EXOR gate 10, which may feed through to the alternation network a correction term from a neighbouring alternation network or a correction term from a network outside of the present network, for instance a block bypass, in order to speed up the overall processing of the microprocessor chip. The speeding-up function will also be described in greater detail later.

As several copies of the arrangement of FIG. 3 may be connected together, AND gate 12 serves as a partition switch whose function is controlled by a signal $P_s$ where s denotes the segment identifier. For example s=0 is considered to be the leftmost segment, the starting segment with no segments to its left. If this signal is TRUE then the carry forward of the correction term (LAI1) to that segment via the partition switch to that alternation network segment is disabled. The correction term LAI1 is otherwise derived from a neighbouring segment.

If the partition signal is TRUE then communication into this segment is also disabled, and the inject network 8, which controls the insertion of a propagating signal (LAI1) into the leftmost end of the modular alternation network, as well as responding to the partition flag ($P_s$) to regulate input to the network.

Figure 4:
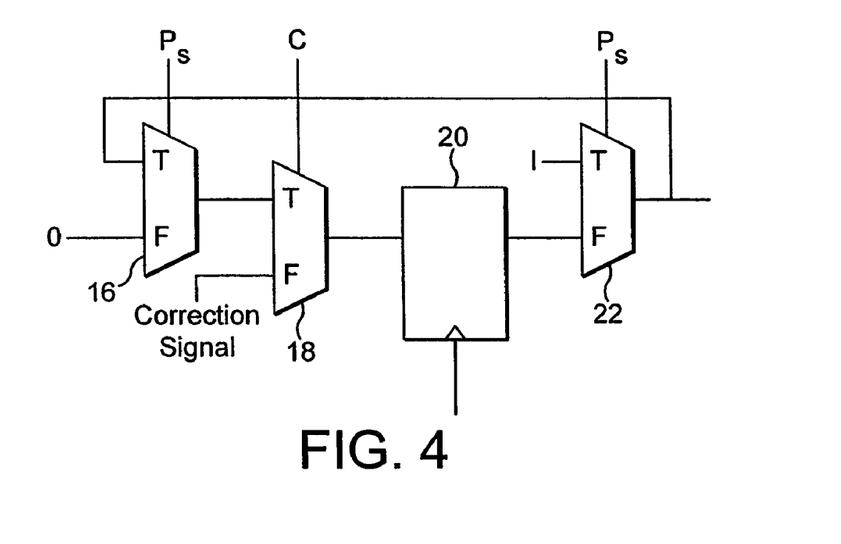
FIG. 4 is a circuit diagram showing the inject network of FIG. 3 in greater detail.

The inject network is shown in detail in FIG. 4 and comprises three multiplexers 16, 18 and 22 and an isolation flip-flop 20. Multiplexer 22 responds to the state of a partition flag $P_s$ for the segment. If the term $P_s$ is true it means that particular segment is at the start, or is the left-most segment, and so no correction term will ever be applied to it. Accordingly, when $P_s$ is true the inject condition 'I' will be applied to start processing in that segment. Inject condition I can be programmable true or false. If $P_s$ is false then a correction term will be applied at a later step when the correction term is ready.

Apart from being used to determine whether this segment is partitioned from the segment to the left, the inject condition I can also be used to determine whether the leftmost participating processor in this segment belongs to the even or odd set. This can be determined from the number of results in the sets of odd/even results in the preceding segment. If the partition flag $P_s$ is TRUE, this segment is partitioned from segments to its left. The global inject condition then overrides all forward propagating correction terms into the network input and unconditionally becomes the input to the ALTERNATION NETWORK.

The multiplexer 16 at the far left of the inject network is also dependent upon the partition flag $P_s$. If $P_s$ is false then the initial state (which is frequently tied to ground or '0') is passed through to multiplexer 18 which responds to a correction signal C. The correction signal C determines whether the inject network continues to loop (until C becomes false) or whether the correction signal determined by the alternation network is ready to be injected back into the alternation network (once the correction term has been determined and is stable). The correction signal C is only inserted back into the alternation network when an initial static result of odd/even sets has been determined based upon the initial assumed matching value. When C is false the correction signal is clocked through the isolation flip-flop which also flips to allow the correction term to be injected into the lowest order network and apply any correction as appropriate to the set of odd/even results. The corrected set of odd/even results is stored as vectors, and the way these vectors are stored is described in greater detail below.

It is remembered that upon initiation of an odd/even alternation process the initial starting value against which $M_n$ values are compared (which represents the total number of odd and even matches in the preceding segment(s)) is assumed—normally '0'—and once the initial set of odd/even results are generated based upon this initial assumed starting value, the correction term is then applied to ensure that the odd/even alternation in this segment follows from the odd/even split in the previous segment(s)—the correction term can in this sense be considered as a parity check. Obviously a correction step is not needed if this segment is the first in line, which is when the inject condition is used instead.

In operation, there are two distinct phases—the first phase is the generation phase when the set of odd/even results are being propagated through the alternation network based upon the initial assumed matching value. Whilst this is going on the flip-flop prevents the correction signal (determined from a preceding segment) to be inserted into the current segment and the correction signal C is true. Once the initial set of odd/even results have been generated, the correction signal C stops, at which point the correction term is applied through the isolation flip-flop and allows the correction term to be applied to the lowest level network. Any corrections are then propagated through the alternation network to arrive at the final, corrected set of odd/even results.

In other words, the communication network will be generating a carry forward correction term into the alternation network input which will be used to modify the initial state of the alternation network (provided that $P_s$ is FALSE). The initial state of the alternation network is used as the basis of generating the correction terms and propagating them forward through the network, hence the correction term is isolated from the alternation network by the isolation flip-flop.

Once the correction term has been generated and is stable, it will be clocked through to the alternation network during the second phase of alternation network operation, when the correction term will be enabled through the isolation flip-flop and applied to the initially-determined set of odd/even results.

When the signal C is false, then the isolation flip-flop will be pre(set) or pre(reset) depending upon the state of the inject condition I and the partition flag $P_s$.

In an alternative embodiment for deriving a set of odd/even results, a second alternation network may be provided to run the correction term at the same time as the first alternation network is determining the propagation signal and correction term for the following segment. An example of this arrangement is shown in FIG. 5.

Figure 5:
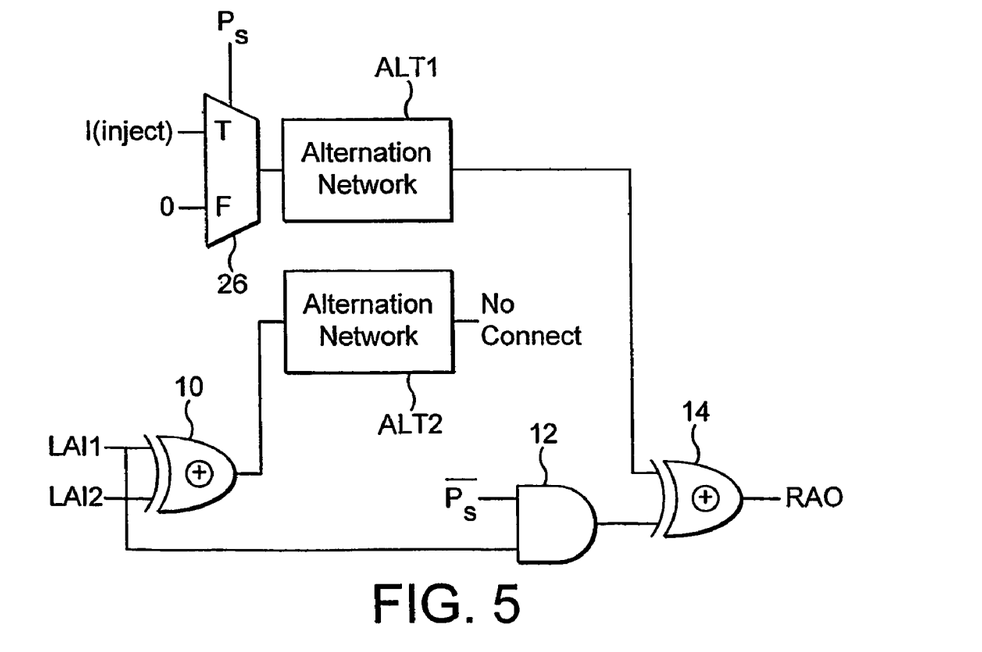
FIG. 5 is a circuit diagram showing an alternative to the network shown in FIG. 3.

In FIG. 5 there are two sets of alternation networks Alt1 and Alt2 both receiving the same set of $M_n$ data for comparison. Alt1 is connected at the starting end with a multiplexer 26 similar to those shown in the inject network of FIG. 4, except that the partition flag $P_s$ determines whether the initial inject condition I is used (if the segment was the first after a partition), or whether '0' is to be used as the initial assumed value. While propagation takes place through alternation network Alt1 to determine the set of odd/even results based upon the assumed value I, at the same time the lower alternation network Alt2 is determining the same set of odd/even results using the same set of $M_n$ data inputs as Alt1 is using. However, the alternation network Alt2 is also receiving a forward propagated correction term via EXOR gate 10 which, itself will have been generated by a preceding alternation network. As a result of this network's asynchronous operation, segments further away from the start may have several correction terms applied to its set of odd/even results until a static condition is achieved.

The set of odd/even results generated by the alternation network Alt2 is stored in a set of registers, referred to as TAG registers, for further use.

The network shown in FIGS. 2 to 5 achieves the functionality of generating alternating match sets of odd and even items at a vastly improved speed over the current art, and as mentioned before this is required for the common task of 'divide and conquer' calculations. This improvement in speed is achieved by generating an initial alternate odd and even appropriation locally within a segment, then generating a correction term based on the forward propagation of the output of the local EXOR chains from preceding segments. The correction term, when it has reached a static value, provides information about whether the total number of matches within a segment are even or odd. This correction term is forward propagated through the network, utilising a hierarchy of bypass levels (which are described in greater detail below), which further accelerate the propagation of correction terms. In a subsequent cycle, the correction term is utilised to generate a new input to the local segment, which then serves to cause the segment to maintain or reverse initial alternate order to achieve the correct final state.

The module shown in FIG. 3 can now be readily cascaded to form a higher-order network. For example, FIG. 6 shows a number of identical alternation network segments of the type shown in FIG. 3 cascaded to form a block network.

The block partition switch 30 is controlled by a block partition flag $P_b$ which is the logical combination of individual segment partition flag $P_s$ control signals. In this way, only if all segment partition switches 12 (not shown in FIG. 6) within the span of a block are closed is the forward propagation of a correction term enabled. This is to prevent alternation networks within the block being bypassed which have been tasked to process relevant data.

Figure 6:
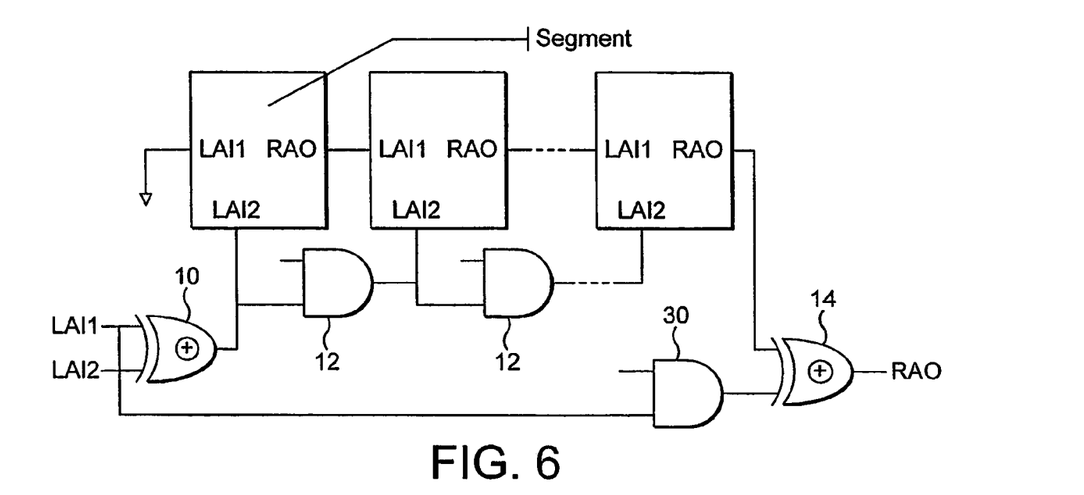
FIG. 6 shows a modular network comprising multiple segments of the network as shown in FIG. 3.
Figure 7:
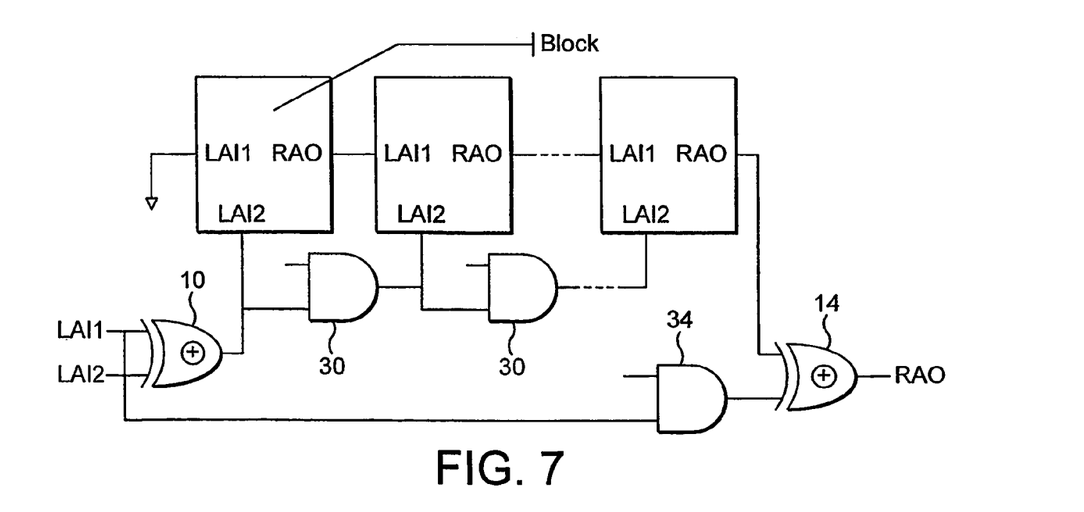
FIG. 7 shows a modular network comprising multiple blocks of the network as shown in FIG. 6.

The hierarchical arrangement described above can be extended indefinitely, for example by the cascading block-level networks as shown in FIG. 6, accompanied by the addition of the corresponding external network as shown in FIG. 7.

In the example of FIG. 7 it Is assumed that a chip comprises an array of blocks, as per the definitions above. The block bypass partition switch 30 and the microprocessor chip partition switch 34 perform similar functions to the segment bypass partition switch 12 and the block partition switch 30 of FIG. 6. For clarity, microprocessor chip will hereafter be referred to simply as 'chip'.

It is anticipated that this hierarchical network topology can be readily extended limited only by the constraints of the target speed of the correction phase and the floorplan topology of the integrated circuit. It is anticipated therefore that the hierarchy within a given chip may be extended to comprise more than the two levels described above to comprise any number of levels or subnets.

Ultimately however, the communications signals must propagate off-chip, supporting the goal of transparent chip-chip communication, as well as supporting the continuation of the network logical hierarchy with a minimum of external logic.

Figure 8:
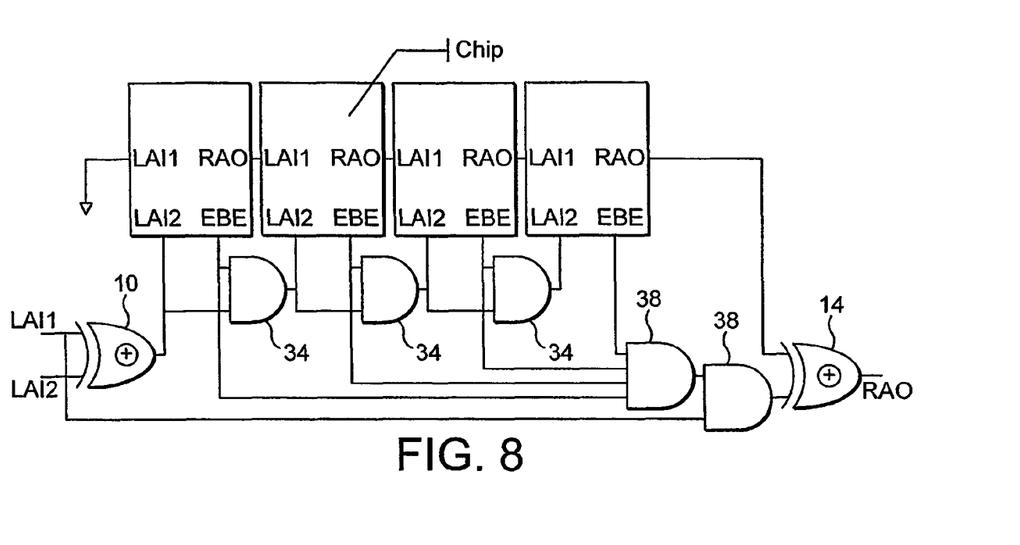
FIG. 8 shows a modular network comprising multiple chips implementing the network as shown in FIG. 7.

FIG. 8 illustrates how the network hierarchy may be readily extended across multiple chips on a board. In this example a signal EBE has been introduced which is assumed to be TRUE if the chip may be bypassed, that is no open switch exists anywhere within that chip on any hierarchical level. Board bypass switches 38 are set true or false according to the signal EBE.

The examples shown in FIGS. 3 to 8 demonstrate the readily-expandable and modular nature of this type of chip design, which is extremely flexible and can be tailored to suit the demands of the application.

Figure 9:
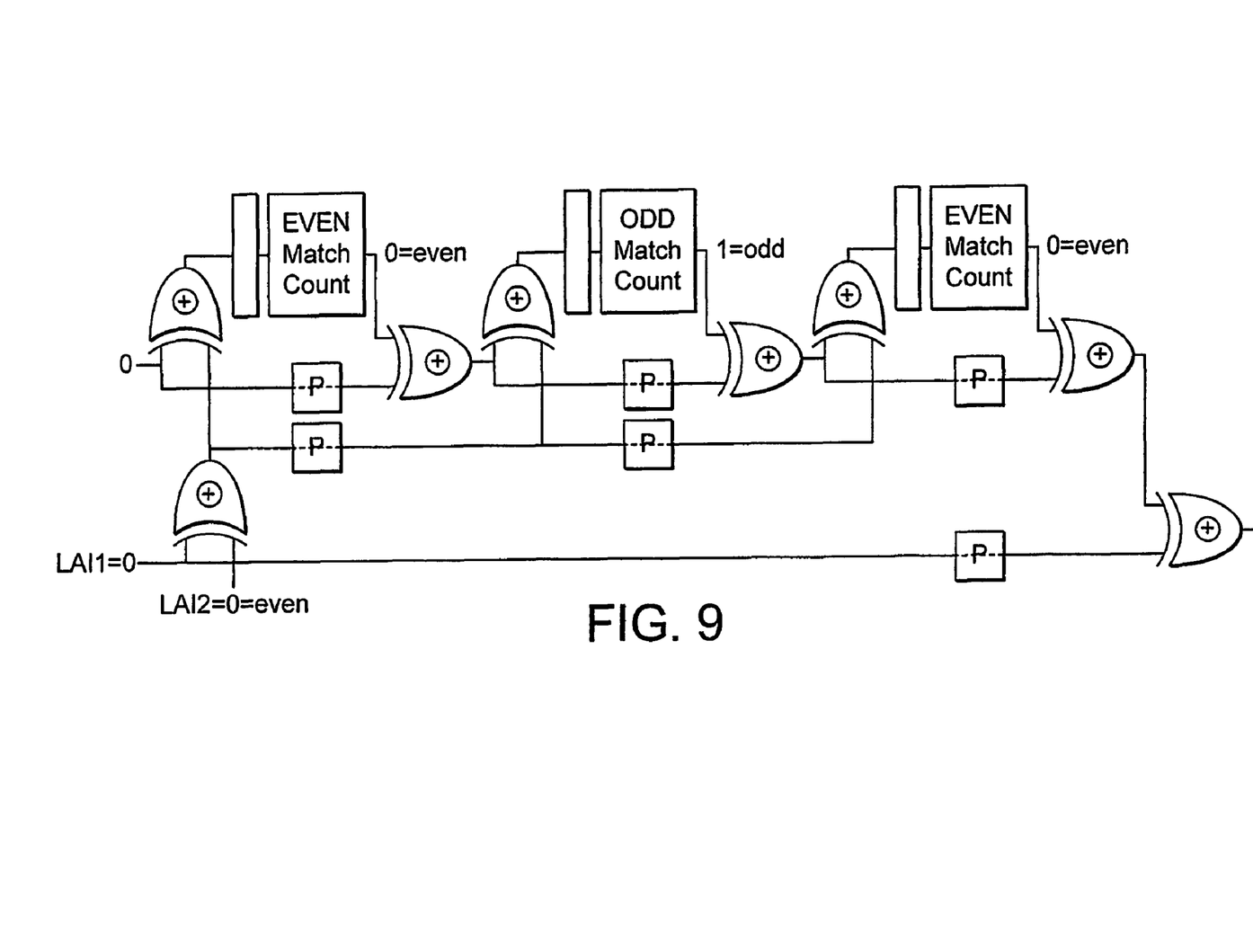
FIG. 9 is a schematic of a network according to the invention describing in detail the role of a forward-fed correction term.

The operation of a hierarchical network as described above is illustrated in FIG. 9, which shows a representative block comprising three segments. In this example, as no partition flags are set the network is continuous and unbroken along its length. The initial state of the individual segments is evaluated in parallel (assuming a default inject condition set FALSE), resulting in sets of even and odd match counts. These are then combined by the carry forward network as described in FIGS. 3 to 5 to produce the correction terms. The role of the EXOR networks becomes clear in this illustration since the carry forward of pairs of odd correction terms (FALSE, FALSE) or pairs of even correction terms (TRUE, TRUE) always results in the generation and propagation of an even (TRUE) carry forward term. Thus, the alternating odd/even continuity is maintained across the three segments. Similarly, the application of, say, an even and an odd correction term (TRUE, FALSE) results in the propagation of an odd correction term (FALSE) to maintain odd/even continuity in a following segment.

The duration of generation and propagation of the correction terms is determined by the internal modular hierarchy within the network. The final stable correction terms are applied on a subsequent clock edge, when the isolation flip-flop in the inject network is clocked—this is described in the narrative accompanying FIG. 4. Following the application of the correction term, a sufficient interval must be allowed for the correction term to propagate through the individual segment networks to achieve the final even-odd split. This interval will be designed to be less than one clock cycle.

Whenever an operation is extended (such as the generation and propagation of the correction terms) this is implemented in the context of a synchronous processor device by issuing repeated instructions according to a deterministic (compiled) algorithm.

It is found that a typical usage of the network requires a sequence of one or more of the correction data processor instructions, followed by an evaluation processor instruction and a single propagation instruction. Control logic within the chip instruction unit allows the length of this sequence to be deterministic.

EXAMPLE I

Consider the following example. The instruction sequence that needs to be fed to the data processor for a particular application is:

{{A}RepeatSlot(4), B } where {..} RepeatSlot(N) means repeat the instruction inside the braces N times.

EXAMPLE ASP ALTERNATION CODE

Consider the following example. Count participating APEs and write the count into the data register in the rightmost APE in the string.

The pseudo-code for this is:

```
identify participating APEs;
A = 0;
FOR X = LSB TO MSB DO
    alternate participating APEs into even and odd sets;
    IF rightmost APEs is in odd set THEN
```

-continued

```
        A[rightmost][X]=1;   (* Xth   bit of rightmost APE is
set *)
        mask odds and reassign evens as new participating APEs
END
```

The actual ASP code to perform this task is given below:

```
Initialise
    {
    {InitWriteSerial(every,slOpen,dX,dX,0,0,aw{ab2.d0,ab1.d0}
,NoRead)},
        {ExecWrite(bmD,NoCsoOpt)}};
Start of loop, initialise for counter and set intra and
inter chip inject inputs to TRUE
        {Set(agbInject),
        For(sfsz,1),
            {SegmentInject(1)},
            {NoOp( )}};
Finding participating processors and generate alternate
even-odd subsets
        {
    {InitSearchOrAddSerial(dX,dX,0,0,aw{ab2.d0,ab0.d1})},
            {ExecSearchOrAddSerial(bmD,trAlt,NotForceZero),
            RepeatSlot(AlternateSlots)}};
Set intra-chip inject inputs FALSE
        {{SegmentInject(0)},
            {NoOp( )}};
Set inter-chip inject input FALSE
        {Clear(agbInject),
    {InitWriteSerial(at,slOpen,dX,dX,0,0,aw{ab1.d1},NoRead)},
            {ExecWrite(bmD,NoCsoOpt)}};
Establish that rightmost participating APE is odd
        {
    {InitWriteTernary(anl,slOpen,tf0,XT,ScalarBus,aw{})},
            {NoOp( )}};
        {
    {InitWriteSerial(all,slOpen,dX,dX,0,0,aw{ab2.d1},NoRead),
            RepeatSlot(ActivateSlots)},
            {ExecWrite(bmD,NoCsoOpt)}};
        {
    {InitSearchOrAddSerial(dX,dX,0,0,aw{ab0.d1,ab1.d0,ab2.d0}
)},
            {ExecSearchOrAddSerial(bmD,tr1,NotForceZero)}};
        {
    {InitWriteTernary(anr,slOpen,tf0,XT,ScalarBus,aw{}),
            {NoOp( )}};
Write result LSB
        {Init(sfa1,sfba1),
    {InitWriteSerial(aerf,slOpen,d1,dX,sfa1,0,aw{ab2.d1},NoRe
ad),
            RepeatSlot(ActivateSlots)},
            {},
            Inc(sfa1)};
        {{},
            {ExecWrite(bmD,NoCsoOpt)}};
Mask current odd set from participating in next cycle of
alternates
        {
    {InitWriteSerial(every,slOpen,dX,dX,0,0,aw{ab1.d0},NoRead
)},
            {ExecWrite(bmD,NoCsoOpt)},
            EndFor( )};
```

The evaluation of this task using the invention would result in completion of this application in 240 clock cycles instead of 304 clock cycles using the network shown in FIG. 2, which represents the prior art. The effect is far more significant in the next planned ASP device, which will incorporate 4096 APEs. Here completion of the algorithm will require some 400 clock cycles, compared to some 2500 clock cycles without the invention.

Figure 10:
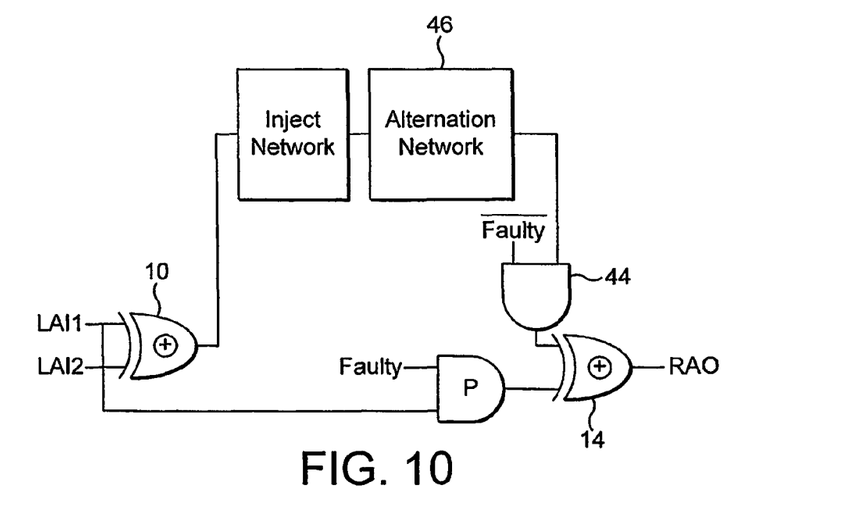
FIG. 10 shows an efficient circuit design catering for redundancy in the event of a faulty microprocessor component.

The hierarchical nature of the network topology allows a subnet (at segment, block, chip etc. levels) to be readily bypassed in the event of a defect which results in faulty operation. For example, FIG. 10 shows the addition of an isolation gate 44 in the output of an alternation network 46 forces the output to a null state in the event of a fault in the alternation network 46. By forcing the partition switch P unconditionally closed existing hardware may be exploited to allow any forward propagating correction terms to unconditionally bypass the segment, block or chip etc. Whilst built-in redundancy is a known technique, this chip design enables a particularly space efficient method of achieving redundancy at all levels of the hierarchy.

In practice, an implementation of the invention can be found in the VASP-4096/TX microprocessor. This microprocessor design completes a full alternation across 4096 data parallel processor in a simulated interval of 24 ns—or 5 clock cycles at 160 MHz. It is implemented in a single 0.18 µm silicon process.

In the above embodiments, once an alternating odd and even set has been identified it is usual for the values identified by the odd and even sets to be summed. It is worth remembering that only memory addresses that have been successfully matched with the match signal are alternated odd and even, and once the alternation has taken place, the values contained at those memory addresses need to be processed, usually by summation. In previous designs summation takes place wherein the value of each memory address is checked against the match signal, and if true, the value contained in that memory address is added to a previous sum and the next memory address checked in turn. This synchronous summation is time consuming, especially in a case where adjacent memory addresses are far apart in memory address space.

The hardware embodiments shown in FIGS. 2 to 10 demonstrate that the identification and alternating actions of the overall summation procedure can be achieved through chip design alone. Furthermore, through use of bypass networks at all levels of the modular hierarchy, the speed of the chip may be increased significantly. For a large-scale 'divide and conquer' procedure involving many thousands of data items, many iterations of the 'identify and alternate' process need to be carried out before all these data items have been summed together. An overview of this procedure is provided in the flow chart of FIG. 11.

Figure 11:
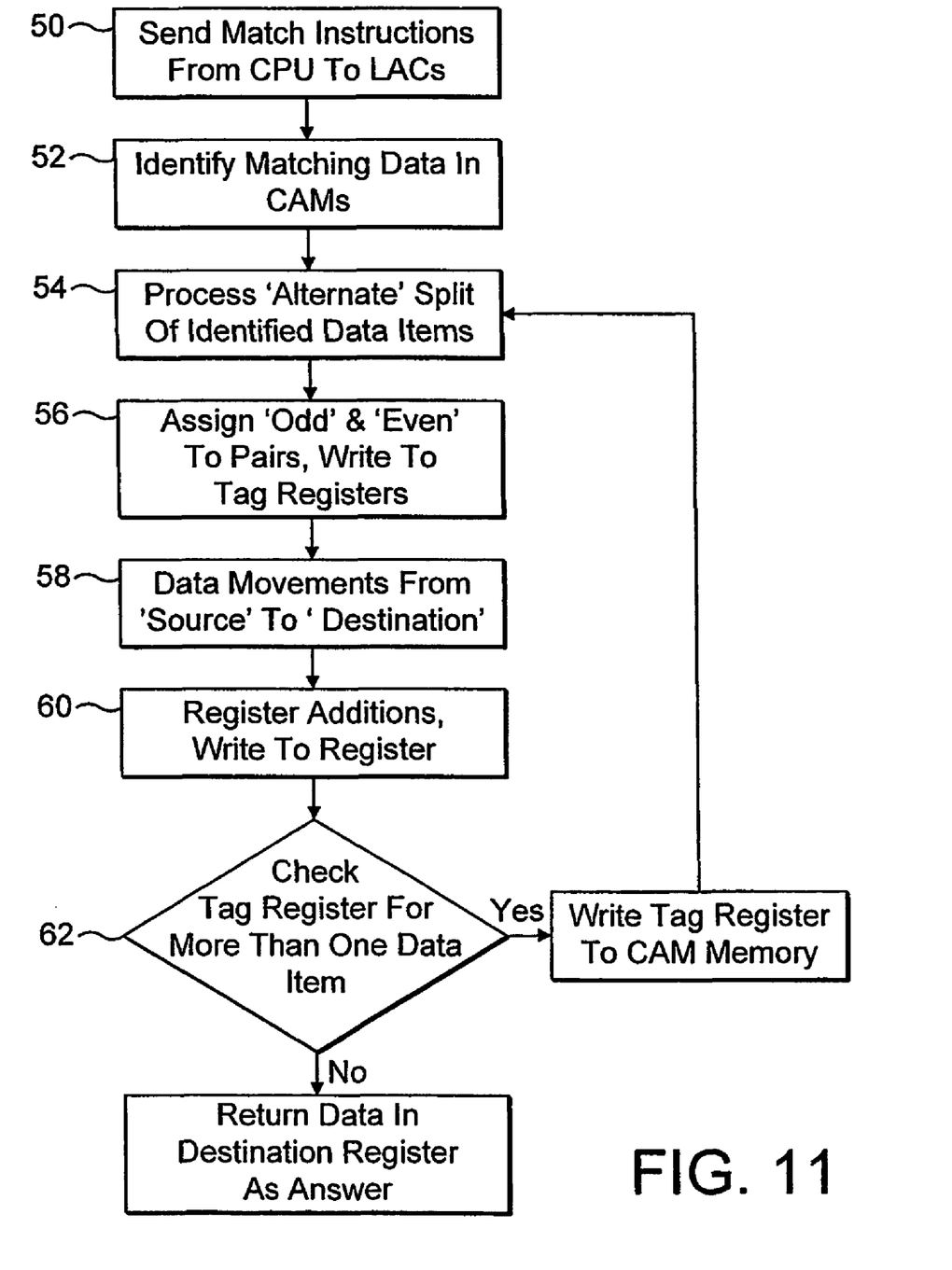
FIG. 11 is a flow chart covering the steps in carrying out a 'divide and conquer' operation in accordance with the present invention.

Starting at 50, the CPU sends instructions to LAC controllers to identify required data items. Next, at 52 the LACs determine the data items from their associated CAM memory that match the required parameters, and by processing these data items through alternation networks at 54, these data items are split into odd and even pairs and the resulting sets of odd and even results are written as vectors into TAG registers at 56. Remembering that each data item corresponds to a data register containing a binary word of data, a movement of data then takes place at 58 of the data words from the data register of data 'sources ' (which can be user-defined as corresponding to 'odd' or 'even' data items) to the data register of data 'destinations', which will be the 'odd' or 'even' complement of the data sources. Register additions may then take place and the results written to the destination data register at 60. A check is then carried out at 62 to see if there is more than one data item in the 'even' TAG register. If there is, the data in the 'even' TAG register is written to the CAM at 64 and the procedure loops back to 54 to continue splitting data items into 'eve' and 'odd' pairs until the final check at 62 determines that there Is only one data item left. When there is only one data item left, the check at 62 returns a negative finding in which case the data in the remaining data register is the answer to the 'divide and conquer' summation.

As can be seen from the above, the movement of data items from an 'even' data register to an 'odd' data register is crucial to the overall speed of the network in carrying out the 'divide and conquer' summation. It is easily imaginable that after several splitting and summation steps that the remaining data items left are spaced far apart. The usual procedure for data movement is synchronous data movement, whereby the contents of the data register corresponding to the source processor is shifted one processor along until it reaches the destination processor's data register. Each shift will take a clock cycle so synchronous movement will be very slow compared to the asynchronous data movement achieved in the alternation network stages.

Figure 12:
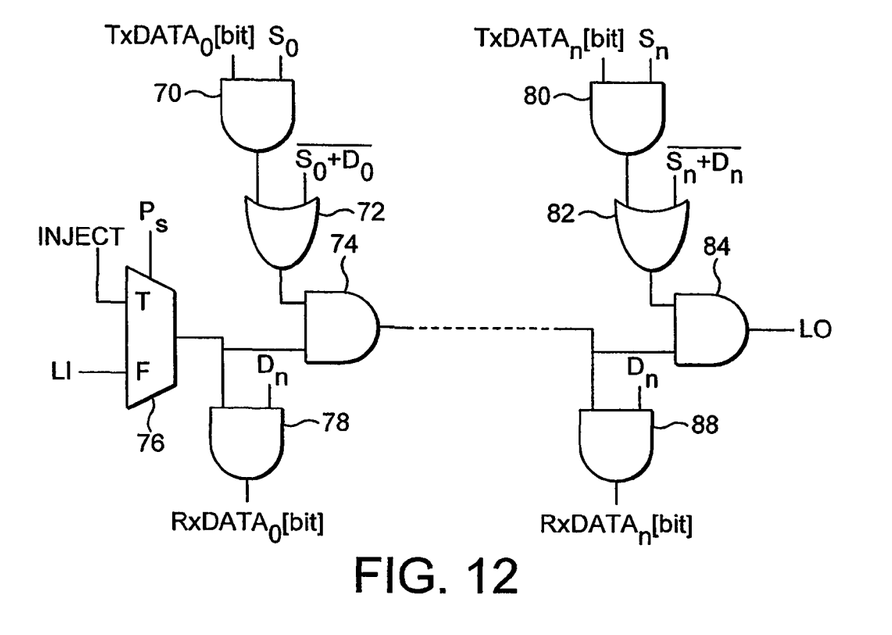
FIG. 12 shows a data propagation network for movement of data from a source to a destination.

An improved summation network referred to as a 'remote activation network' is disclosed in FIG. 12 wherein asynchronous summation is enabled in hardware. From step 56 of FIG. 11 wherein the 'even' and 'odd' data items are written to respective TAG registers, the data items in the 'even' TAG register are bound as 'sources' and the data items in the 'odd' TAG register are bound as destinations. This binding convention may be user defined so that the 'odd' TAG register data items are considered as 'sources'. The idea here is that every source data item will aim to have its data transported to its adjacent destination data item as quickly and efficiently as possible.

Turning to FIG. 12, a single bit of data TxDATA$_0$[bit], for example which is HIGH, from the first source data item's data register is added with a source data item flag S$_0$ (which is set as TRUE) and added into AND gate 70. The output of AND gate 70 is then entered into an OR gate 72 with the inverse of the source flag S$_0$ ORRED with destination flag D$_0$. The destination flag D$_0$ is only TRUE at location of the destination data item so D$_0$ is LO, and the result of OR gate 72 is TRUE as S$_0$ is HIGH. The output of OR gate 72 is fed into AND gate 74 which has as its other input the output from multiplexer 76, which nominally has a TRUE output. Thus the output of AND gate 74 is true, and to the right of the combination of logic gates 70, 72 and 74 are other logic gates arranged identical to logic gates 70, 72 and 74. As all these other logic gate arrangements do not correspond to a source or destination data item, the TRUE output from AND gate 74 is propagated along the series of AND gates (not shown In FIG. 12) until the destination data item is reached. At the destination data item, AND gate 80 outputs a FALSE value as TxDATA,[bit] and S$_n$ are both zero. However, as S$_n$ ORRED with D$_n$ is TRUE, as D$_n$ is HIGH, the inverse of this is LO, so the output of OR gate 82 is FALSE, which means AND gate 84 does not give a TRUE output and stops the propagation of the TRUE output from AND gate 74 along the chain of AND gates. Finally, AND gate 88 provides a TRUE output as both the output from AND gate 74 and D$_n$ are HIGH. The resultant output from AND gate 88 is written into the RxDATA$_n$[bit] destination data register as a HIGH for that data bit. The same works in the case of the source data bit being LO to begin with—in this case rather than AND gate 74 propagating a TRUE output from left to right in FIG. 12, a FALSE output would be propagated instead. This FALSE output would still be stopped by the destination AND gate 84 due to the condition of S$_n$ and D$_n$, and the resultant FALSE value from AND gate 88 would be written to RxDATA$_n$[bit] destination data register as a LO value for that data bit.

Once all the data bits from the source data register have been bit-serially transferred to the destination data register, a simple register addition action can be accomplished to sum the transferred data with the existing data in the destination data register to produce the new value which is written to the destination data register.

Figure 13:
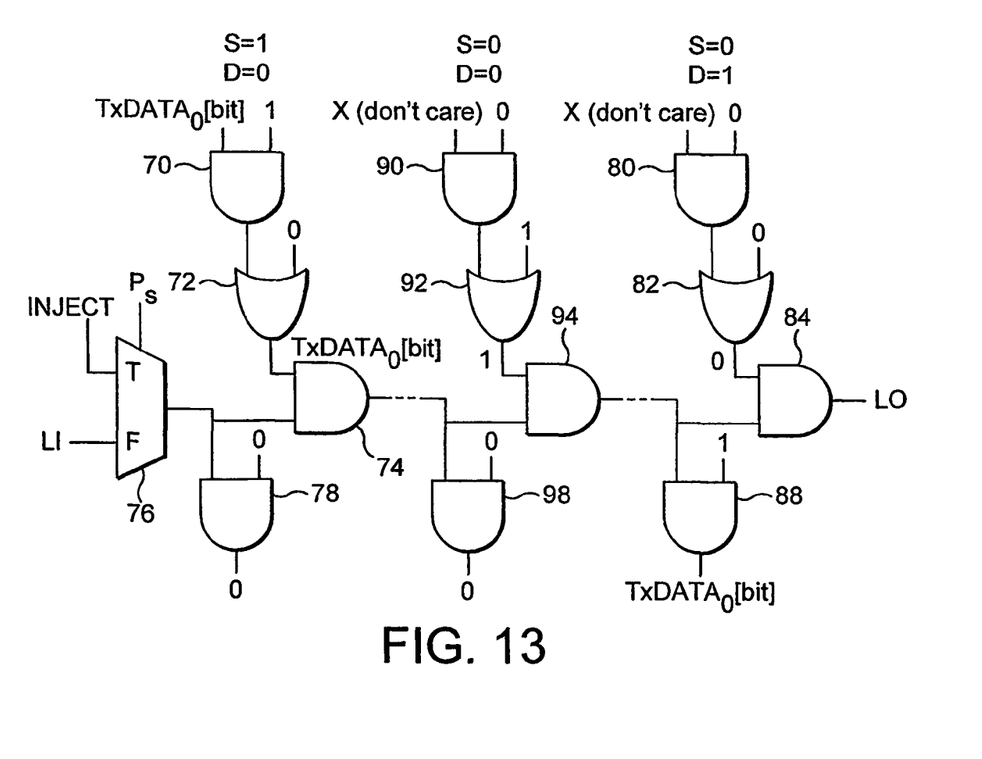
FIG. 13 shows the data propagation network of FIG. 12 in more detail.

FIG. 13 shows the example of FIG. 12 in more detail, in this case the destination data item with corresponding logic gates 80, 82, 84 and 88 is two processors away from the source data item, with corresponding logic gates 70, 72, 74 and 78. Intermediate processors, which do not have an 'odd' or an 'even' data item, and which have corresponding logic gates 90, 92, 94 and 98, do not affect the propagation of the TxDATA$_0$[bit] from the output of AND gate 74 to the AND gate 88 of the destination data item.

In other words, a communication signal is generated from a source node (denoted by S=TRUE) that is then propagated in the direction towards the right side of FIGS. 12 and 13, This data is generally the logical product of a source 'flag' (i.e. S) and a data bit. This data is then propagated transparently through intermediate processors that are neither a source nor a destination (i.e. S=FALSE and D=FALSE), terminating at a processor that is marked as a destination (i.e. D=TRUE).

It is obviously desirable that in order to achieve the maximum processing speed, the data movement network as shown in FIGS. 12 and 13 is able to move data as fast as possible, especially considering the speed of operation of the alternation network that preceded the data movement network. It is noted that the transfer of data between source and destination nodes, as described in the narrative to FIGS. 12 and 13, operate essentially as circuit switched data between a source and a destination, and as no two circuits will ever overlap (due to the alternating 'odd' and 'even' split), data movements between each pair of source and destination can take place simultaneously.

Figure 14:
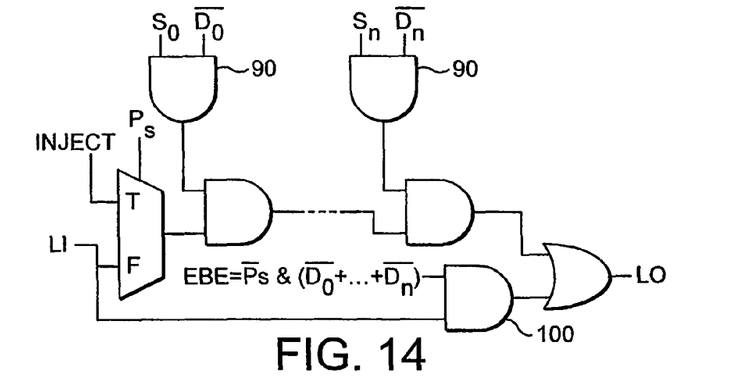
FIG. 14 shows a bypass circuit compatible with the data movement network as shown in FIGS. 12 and 13.

Furthermore, as in the alternation networks, bypass switches may be employed so that segments which do not have a part to play in a circuit between a source and a destination may be bypassed entirely, leading to further speed improvements. FIG. 14 shows this with bypass switch 100. Obviously it is only appropriate to bypass whole segments in cases where bypassing does not progress past isolation switches that occur periodically in the network. One such topology might have such switches every segment. The External Bypass Enable flag which sets the segment bypass switch 100 only allows segment bypass if the following two conditions are met: (1) no isolation switch is open within the span (i.e. all closed); and (2) no destinations are present in the span to be bypassed.

Figure 15:
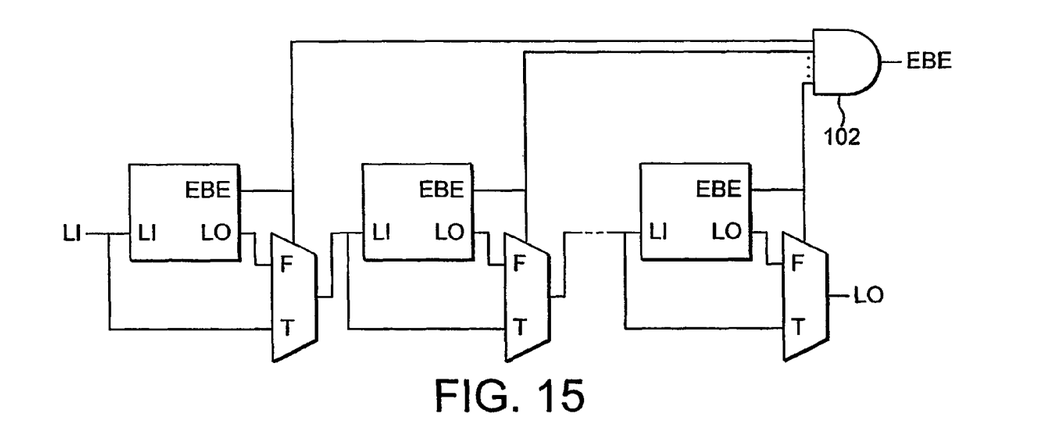
FIG. 15 shows how bypass features may be enabled at a higher level to that shown in FIGS. 13 and 14.

A further variant of the bypass function is shown in FIG. 15 wherein three segments of an asynchronous data movement network exemplified in FIGS. 12 to 14 are able to be bypassed at once if the EBE bypass AND gate 102 is TRUE.

As mentioned before, it is preferable that this bypass topology be repeated hierarchically. The topologies that have been reduced to practise have generally adopted a bypass granularity In multiples of four, i.e. bypassed processors grouped in x16, x64, x256, x1024, x4096 etc.

It is envisaged that allowing propagation of communicated data to occur—and complete—within a single clock cycle is preferable. It is recalled that the operation of this network—although asynchronous—occurs within a synchronous operating framework, i.e. the beginning and end of communication cycles are bounded by clock cycles. Failure to complete the propagation in a single clock cycle will generally require multiple clock cycles to be allocated—defining the communications path a multi-cycle path.

Figure 16:
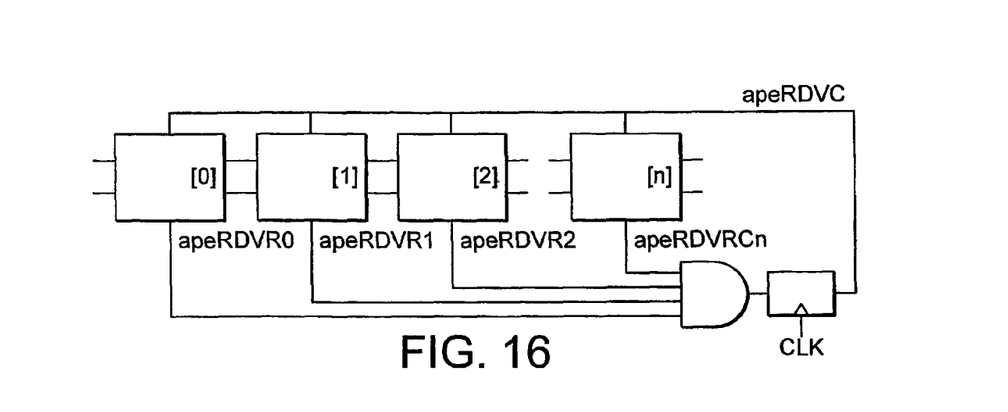
FIG. 16 shows a network for facilitating synchronisation between multiple microprocessor chips.

Moreover in the context of a system comprising communicating processor chips (i.e. extending this network across multiple devices), it is unlikely that the operations between chips can be easily maintained as clock synchronous. Therefore a method of achieving clock level synchronism—via an appropriate mechanism—is achieved in order to make this invention viable as a scaleable system. Such a synchronisation scheme involves a software programmed wait( ) statement which is linked to a hardware rendezvous. Such a rendezvous may be signalled by multiple generators—which must all reach the synchronisation point before the communications operation may proceed. The synchronisation is achieved using a pair of rendezvous signals, ape Rendezvous Request (apeRDVR) and ape Rendezvous Complete (apeRDVC). This synchronisation may occur between autonomous chips. FIG. 16 illustrates this.

In FIG. 16, all the apeRDVR signals from the devices are combined using an AND gate, ensuring that all chips are ready to communicate. The resulting signal is optionally resynchronised to the master chip clock—the output of which is connected to all the chip apeRDVC inputs to signal that the communication may proceed.

Naturally, although the foregoing descriptions suggest a communication topology that routes from left to right, in fact such a network is beneficially extended to include operation which is simplex (i.e. configurable to communicate leftwards or rightwards) and duplex (i.e. duplicate networks are implemented, allowing simultaneous communications leftwards and rightwards).

Having described particular preferred embodiments of the present invention, it is to be appreciated that the embodiments in question are exemplary only and that variations and modifications such as will occur to those possessed of the appropriate knowledge and skills may be made without departure from the spirit and scope of the invention as set forth in the appended claims.

The invention claimed is:

1. An alternation network for use with a content addressable memory for implementing a divide and conquer algorithm, the network comprising:
   a plurality of alternation modules connected in series together, each module comprising:
      a plurality of cascaded logic gates arranged to propagate a match parity signal via the gates along at least part of a matching result vector, the matching result vector being generated by execution of a matching instruction on the content addressable memory, and the logic gates being configured to change the parity of the match parity signal in accordance with the matching result vector; and
      a vector output arranged to output a parity level vector of the propagated match parity signal present at the each gate of the plurality of logic gates;
   a logic network for dividing the matching result vector into an odd match vector and an even match vector representing respectively odd and even numbered elements of the matching result vector, by use of the parity level vector; and
   means for writing a selected one of the odd and even match vectors to the content addressable memory.

2. An alternation network of claim 1, wherein the plurality of cascaded logic gates are arranged to implement a cascading exclusive-OR function on at least part of the matching result vector.

3. An alternation network of claim 1, wherein each module further comprises a parity output for outputting a resultant parity of the plurality of cascaded logic gates, after the match parity signal has propagated through all of the logic gates of the module.

4. An alternation network of claim 1, further comprising generating means for generating a feed-forward term, the generating means being arranged to utilize the parity output of a neighboring alternation module.

5. An alternation network of claim 4, wherein the generating means is arranged to utilize a correction term, the correction term being generated from a non-neighboring alternation module.

6. An alternation network of claim 5, wherein the correction term represents the parity of a part of the matching result vector as determined by a section of the alternation network comprising a plurality of alternation modules.

7. An alternation network of claim 4, wherein the vector output is arranged to be generated after a received feed-forward term has been applied to the module.

8. An alternation network of claim 4, further comprising a plurality of interconnection pathways, means for determining a correction term from the parity of combined feed-forward terms, and pathways for feeding back the correction term to one or more alternation modules.

9. An alternation network of claim 8, wherein the correction term is generated from a hierarchy of interconnection pathways.

10. An alternation network of claim 4, further comprising a partition switch for each alternation module, the partition switch being arranged to disable propagation of the parity of the feed-forward term to any other alternation module.

11. An alternation network of claim 1, wherein the plurality of cascaded logic gates comprises a first cascade of logic gates arranged to calculate the parity of the matching result vector; and
   a second cascade of logic gates for implementing an exclusive-OR function on the matching result vector using the received feed-forward term.

12. An alternation network of claim 11, wherein the first cascade of logic gates is arranged to implement an exclusive-OR function on the matching result vector using a predetermined logic level input to a head of the plurality of cascaded logic gates.

13. An alternation network of claim 1, wherein each module further comprises an injection module for receiving a starting logic level for the module and injecting the same into the plurality of cascaded logic gates.

14. An alternation network of claim 13, wherein the injection module is arranged:
   to assume an input logic level;
   to inject this into the plurality of cascaded logic gates;
   to compare the assumed input logic level with the received starting logic level and
   to inject the starting logic level into the plurality of cascaded logic gates if there is a difference.

15. An alternation network of claim 13, wherein the parity output is arranged to create the parity level vector from the injection of the assumed input logic level when the assumed input is correct and to create the parity level vector from the injection of the starting logic level when the assumed input is incorrect.

16. An alternation network of claim 1, wherein the logic network comprises an AND gate for generating an element of the even match vector from the parity match signal and the matching result vector.

17. An alternation network of claim 1, wherein the logic network comprises an inverter for inverting the propagated parity match signal and an AND gate for generating an element of the odd match vector from the inverted propagated parity match signal and the matching result vector.

18. An alternation network of claim 1, wherein the logic network comprises means for storing the odd and even match vectors.

19. A combination of an alternation network as claimed claim 1 and a content addressable memory, the content addressable memory being arranged to receive the selected one of the odd and even match vectors for use as a matching result vector in a further iteration of the divide and conquer algorithm.

20. A combination of claim 19, further comprising a plurality of addition registers, each addition register being associated with an element of the content addressable memory.

21. A combination of claim 19, wherein the content addressable memory comprises a plurality of strings of array processors.

22. A communications network for use with a content addressable memory for moving data between remote locations, the network comprising:
dividing means for dividing a matching result vector generated by execution of a matching instruction on the content addressable memory, into an odd match vector and an even match vector representing respectively odd and even numbered elements of the matching result vector;
assigning means for assigning the odd and even match vectors as source and destination locations;
a plurality of cascaded logic gates arranged to propagate data via the gates along at least part of the matching result vector;
input means for inputting a bit of a stored data value associated with a source location into the plurality of cascaded logic gates;
applying means for applying the source and destination results to the plurality of cascaded logic gates to propagate the bit of stored data at the source location to the destination location; and
extracting means for extracting the input bit from the plurality of cascaded logic gates at the destination location.

23. A communications network of claim 22, wherein the network is arranged to propagate a bit of the data stored at each source location to a corresponding destination location concurrently.

24. A communications network of claim 22, wherein the plurality of cascaded logic gates is arranged to implement a cascading AND function.

25. A communications network of claim 22, wherein the plurality of cascaded logic gates comprises a plurality of groups of sequentially connected logic gates.

26. A communications network of claim 25, wherein each of the plurality of groups comprises an activation switch for activating or deactivating the respective group of sequentially connected logic gates.

27. A communications network of claim 22, further comprising bypass means for connecting one group of sequentially connected logic gates to another non-neighboring group of sequentially connected logic gates, thereby bypassing a neighboring group of sequentially connected logic gates.

28. A communications network of claim 27, wherein the bypass means is arranged to be activated when the neighboring group of sequentially connected logic gates does not comprise any destination location.

29. A communications network of claim 27, wherein the bypass means is arranged to be activated when the neighboring group of sequentially connected logic gates is deactivated.

30. A communications network of claim 27, wherein the bypass means is arranged to be activated when a plurality of neighboring groups of sequentially connected logic gates do not comprise any destination location.

31. A communications network of claim 27, wherein the bypass means is arranged to be activated when a plurality of the neighboring groups of sequentially connected logic gates are deactivated.

32. A combination of a communication network as described in claim 22, a content addressable memory, and a plurality of addition registers.

33. A combination of claim 32, wherein the combination is arranged to implement a remote addition algorithm, whereby data stored in the plurality of addition registers of selected source and destination locations are combined together using the communication network.

34. A combination of claim 33, wherein the content addressable memory is arranged to receive the selected one of the odd and even match vectors for use as a matching result vector in a further iteration of the remote addition algorithm.

35. A combination of claim 32, wherein the dividing means comprises an alternation network.

36. A combination of claim 32, further comprising a plurality of addition registers, each addition register being associated with an element of the content addressable memory.

37. A combination of claim 32, wherein the content address memory comprises a plurality of strings of array processors.

* * * * *

UNITED STATES PATENT AND TRADEMARK OFFICE
CERTIFICATE OF CORRECTION

PATENT NO.       : 7,865,662 B2                                    Page 1 of 1
APPLICATION NO.  : 10/539493
DATED            : January 4, 2011
INVENTOR(S)      : Jalowiecki et al.

It is certified that error appears in the above-identified patent and that said Letters Patent is hereby corrected as shown below:

In Column 7, Line 38, delete "Is" and insert -- is --, therefor.

In Column 10, Line 64, delete "Is" and insert -- is --, therefor.

In Column 11, Line 44, delete "TxDATA,[bit]" and insert -- $TxDATA_n[bit]$ --, therefor.

In Column 12, Line 51, delete "In" and insert -- in --, therefor.

In Column 14, Line 66, in Claim 19, delete "claimed" and insert -- claimed in --, therefor.

Signed and Sealed this
Thirteenth Day of November, 2012

David J. Kappos
*Director of the United States Patent and Trademark Office*